(12) United States Patent
O

(10) Patent No.: US 10,188,118 B2
(45) Date of Patent: Jan. 29, 2019

(54) CUTTER FOR MANUFACTURING THREE-DIMENSIONAL NOODLES

(71) Applicant: Jongchan O, Daegu (KR)

(72) Inventor: Jongchan O, Daegu (KR)

(*) Notice: Subject to any disclaimer, the term of this patent is extended or adjusted under 35 U.S.C. 154(b) by 60 days.

(21) Appl. No.: 15/322,641

(22) PCT Filed: May 6, 2015

(86) PCT No.: PCT/KR2015/004497
§ 371 (c)(1),
(2) Date: Dec. 28, 2016

(87) PCT Pub. No.: WO2015/170867
PCT Pub. Date: Nov. 12, 2015

(65) Prior Publication Data
US 2017/0127687 A1    May 11, 2017

(30) Foreign Application Priority Data

May 7, 2014  (KR) .................. 10-2014-0054454

(51) Int. Cl.
| | |
|---|---|
| A21C 11/08 | (2006.01) |
| A21C 11/04 | (2006.01) |
| A21C 11/22 | (2006.01) |
| B29C 43/34 | (2006.01) |
| B29C 43/24 | (2006.01) |

(52) U.S. Cl.
CPC .............. *A21C 11/22* (2013.01); *B29C 43/24* (2013.01); *B29C 2043/3422* (2013.01)

(58) Field of Classification Search
CPC .......... A21C 11/12; A21C 11/04; A21C 11/08
USPC ......................................................... 425/336
See application file for complete search history.

(56) References Cited

U.S. PATENT DOCUMENTS 4,289,470 A * 9/1981 Johnston ................ A21C 11/24
425/336

FOREIGN PATENT DOCUMENTS

| | | |
|---|---|---|
| JP | 2006-255832 A | 9/2006 |
| KR | 10-2011-0077406 A | 7/2011 |
| KR | 20-2011-0008165 U | 8/2011 |
| KR | 10-2013-0079287 A | 7/2013 |

* cited by examiner

*Primary Examiner* — Joseph S Del Sole
*Assistant Examiner* — Thu Khanh T Nguyen
(74) *Attorney, Agent, or Firm* — John K. Park; Park Law Firm

(57) ABSTRACT

The noodle cutter is installed on a common noodle making apparatus. The noodle cutter enables the noodle making apparatus to manufacture noodles which have various three-dimensional shapes, and various sizes. Accordingly, a person can hold the noodles in the three-dimensional shape more easily with chopsticks. The noodles cut by the noodle cutter have embossed surfaces, thereby providing unique shapes that stimulate appetite, differentiated texture, and further enhancing the flavor of noodles. The noodle cutter comprises: rotation shafts (10,11) arranged in parallel with each other and driven by a motor; a first roller (20) and a second roller (21) provided on the outer peripheral surface of the rotation shafts (10, 11) in the form of a cylinder and driven to rotate in close contact with each other; and a molding groove (30) depressed inwardly along the outer peripheral surface of the first roller (20) and the second roller (21).

1 Claim, 5 Drawing Sheets

CUTTER FOR MANUFACTURING THREE-DIMENSIONAL NOODLES

TECHNICAL FIELD

This invention is regarding a noodle cutter for manufacturing various types of noodles. More specifically, this noodle cutter can be installed on any common noodle making apparatus that manufactures noodles of uniform shape and size, so as to improve the structure of the common noodle making apparatus. Thereby, the noodle cutter enables the noodle making apparatus to manufacture noodles in various three-dimensional shapes and in various sizes. Accordingly, the noodles in three-dimensional shapes can be more easily held using chopsticks. In addition, the noodle will have embossed surface, providing unique shapes that stimulate appetite, differentiated texture and enhanced flavors.

BACKGROUND ART

Generally, noodles are made of rice, flour or other powdered grains, battered into long and thin strips for noodle dishes. Because it is relatively easy to make noodles and noodle dishes, they can be found anywhere in the world. In Korea, noodles denoted longevity and were offered in birthday parties or wedding ceremonies. That tradition is still maintained today and noodles such as kalguksu and naengmyeon have become popular seasonal dishes.

There are many types of noodles. The regular hand-battered noodles, extruded noodles where the batter is pressed against round holes on a frame and cut noodles where the batter is flattened using a roller and cut into noodle shapes. To enhance productivity, noodle making machines are popular making extruded and cut noodles.

For example, the noodle making machine (patent no. 10-0740261) employs the batter entered through a hopper is pushed through uniform nozzles. Also, the noodle cutter (utility design no. 20-0307039) is composed of roll blades where the batter is passed through making noodles of uniform shape and size.

These inventions are all techniques that manufacture noodles of uniform size and shape. There has been an invention that manufactured a more diversified noodle shapes and sizes—noodle cutter (utility design no. 20-0297384) has two rollers with various shaped grooves on them which rotated against each other to manufacture noodles.

This invention may be able to manufacture noodles of more diverse shapes and sizes, but its rollers are defectively designed, where each groove cannot be evenly formed on the outside of the rollers and the batter that does not enter into the molding groove are wasted. Also, its roller edges do not efficiently cut the molded noodles and the batter and noodle end up intertwined.

DESCRIPTION OF INVENTION

Technical Task to Achieve with Invention

This invention was created to solve these technical shortcomings. Its purpose is to provide three-dimensional noodle cutter that can manufacture three-dimensional noodles with various shapes and sizes. Its technical task is to provide noodle cutter that can mass produce noodles in three-dimensional shapes can be more easily held using chopsticks and have embossed surface, providing unique shapes that stimulate appetite, differentiated texture and enhanced flavors.

Resolution to Task

The three-dimensional noodle cutter invented to achieve these purposes is comprised of rotation shafts (10, 11) arranged in parallel with each other and driven by a motor; first roller (20) and second roller (21) provided on the outer peripheral surface of the rotation shafts (10, 11) in the form of a cylinder and driven to rate in close contact with each other; and a molding groove (30) depressed inwardly along the outer peripheral surface of the first roller (20) and the second roller (21). The edges of dough introduced in the molding groove (30) are cut by friction between the first roller (20) and the second roller (21), thereby producing noodles. The molding groove (30) is formed in a space between the first curved part (31) and a second curved part (32) alternatively arranged in the longitudinal direction of the rotation shafts (10, 11), the first curved part (31) and the second curved part (32) formed in the first roller, and the first curved part (31) and the second curved part (32) form in the second roller (21) are arranged to be engaged with each other and rotate, whereby dough introduced in the molding grove (30) is produced into noodles (50) having an embossed three-dimensional shapes.

Effect of Invention

This invention can produce noodles in three-dimensional shapes can be more easily held using chopsticks and have embossed surface, providing unique shapes that stimulate appetite, differentiated texture and enhanced flavors. In addition, the apparatus is designed to minimize loss of batter when cut, thereby reducing the costs for ingredients and production time and increased unit productivity.

BRIEF DESCRIPTION OF DRAWINGS

Drawing 1 is the view of the three-dimensional noodle cutter.

Drawing 2 is the view of the three-dimensional noodle cutter by components.

Figure 1:
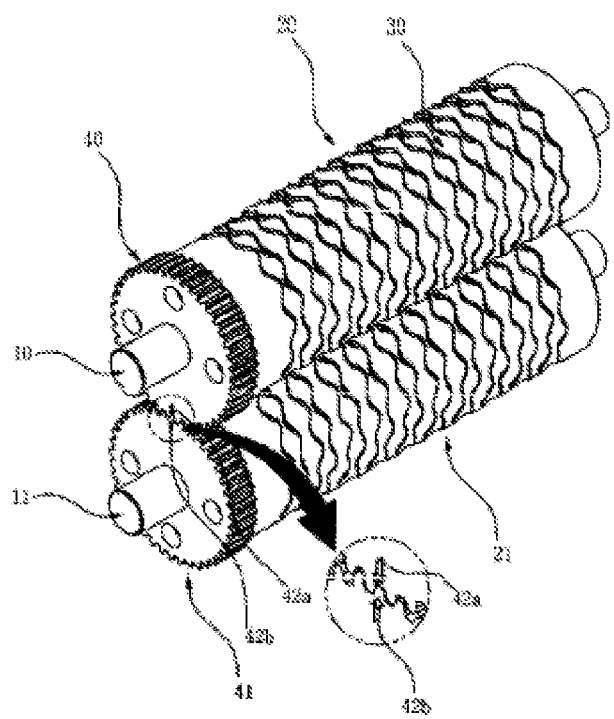
Figure 2:
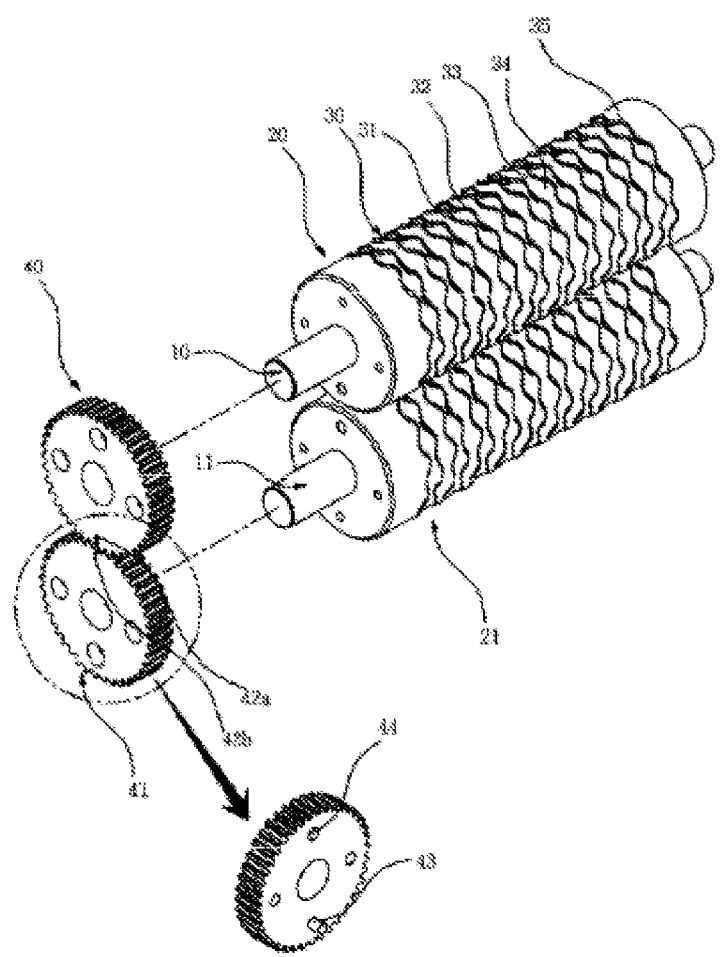
Figure 3:
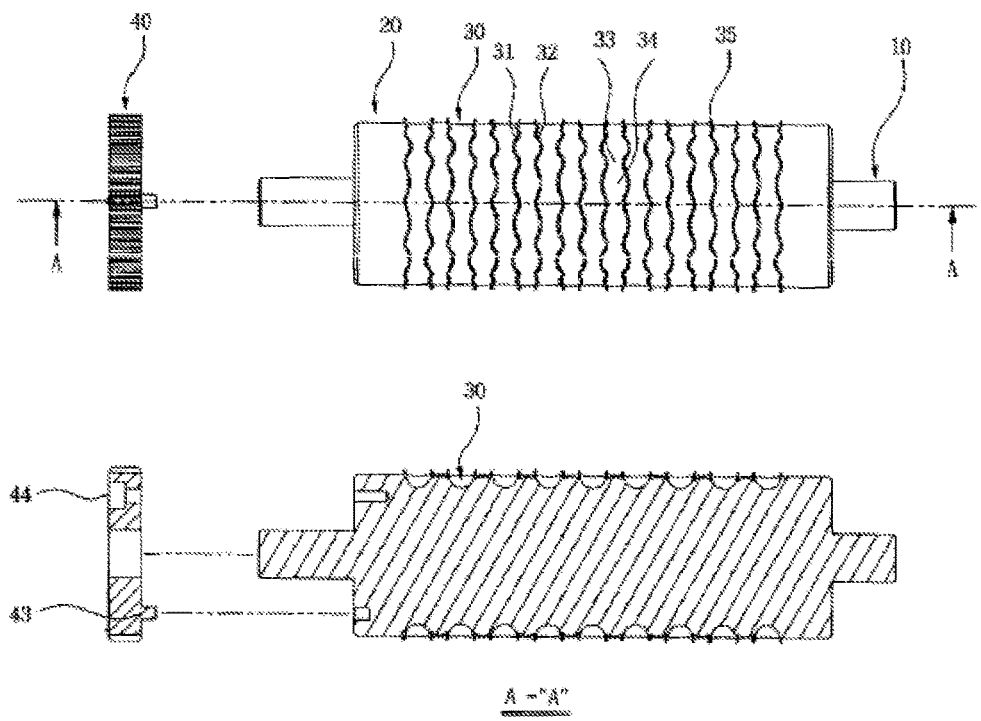
Figure 4:
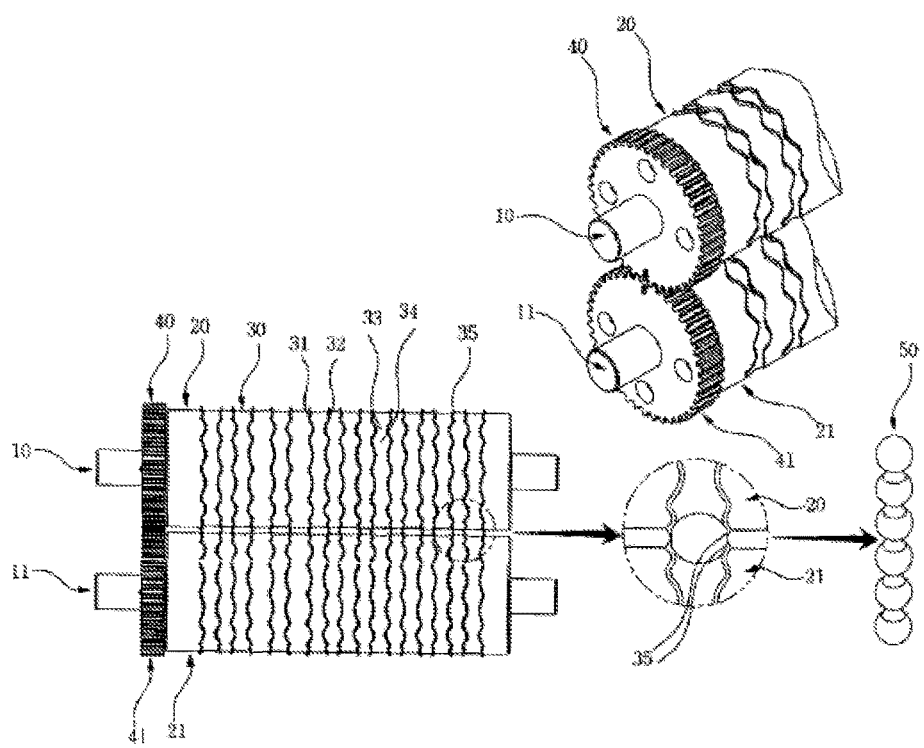
Figure 5:
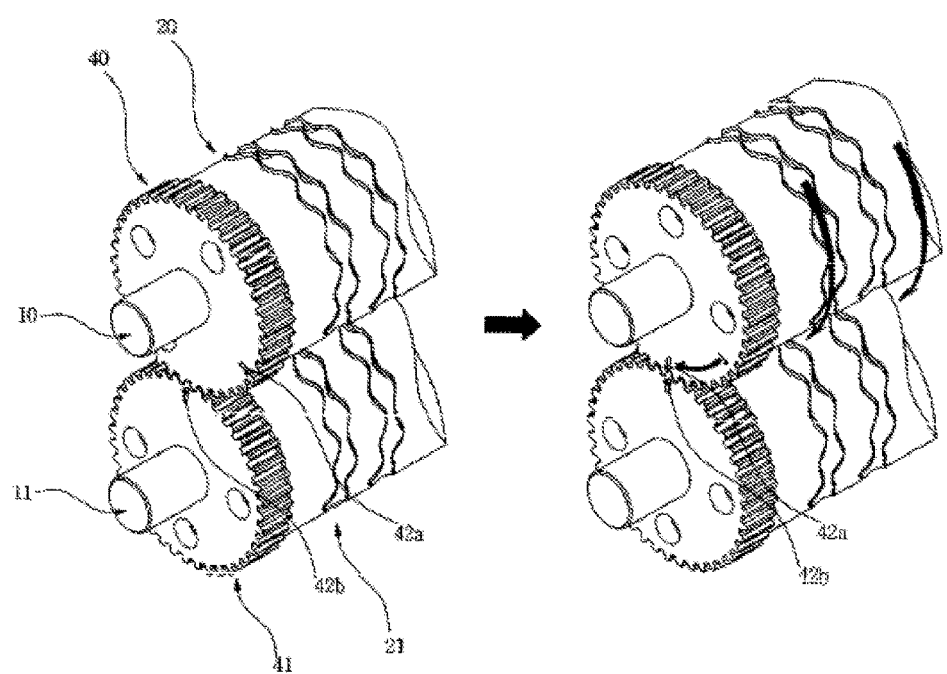

Drawing 3 is the cross section of the three-dimensional noodle cutter.

Drawing 4 is view of example of use of the three-dimensional noodle cutter.

Drawing 5 is view of example of use of the three-dimensional noodle cutter.

DESCRIPTION OF CODES

1: Three-dimensional noodle cutter
10, 11: Rotation shafts
20: First roller; 21: Second roller
30: Molding groove; 31: First curved part
32: Second curved part; 33: Small space part
34: Large space part; 35: Cutting blades
40: First saw teeth; 41: Second saw teeth
42a: First contact point; 42b: Second contact point
43: Alignment pin; 44: Fastener
50: Noodles

DETAILS TO EMBODY THE INVENTION

Correct example of use shall be described in detail using the drawings attached. Keep in mind that this invention can be embodied in various format, as the principles described here are just one example of use of this invention. Throughout this specification, identical codes are used to depict the same components.

It is stressed that this invention is regarding the three-dimensional noodle cutter that can be attached to noodle making apparatus to manufacture three-dimensional and embossed noodles of various shapes and sizes; it is differentiated from existing noodle cutters that make noodles of uniform shape and size.

Drawing 1 is view of the three-dimensional noodle cutter. Drawing 2 is the view of the three-dimensional noodle cutter by components. Drawing 3 is the cross section of the three-dimensional noodle cutter.

As illustrated in drawings 1 through 3, the three-dimensional noodle cutter is comprised of rotation shafts (10, 11), first roller (20) and second roller (21) provided on the outer peripheral surface of the rotation shafts (10, 11), molding groove (30) depressed inwardly along the outer peripheral surface of the first roller (20) and the second roller (21), and the first and second saw teeth (40, 41) attached to both ends of the first and second rollers (20, 21).

The rotation shafts (10, 11) arranged in parallel with each other and driven by a motor. The two shafts (10, 11) rotate in opposite directions and form inlet and outlet directions between them.

The first roller (20) and second roller (21) attached on the outer peripheral surface of the rotation shafts (10, 11) rotate with the rotation shafts (10, 11). Having the same diameter and rotational speed, the first roller (20) and second roller (21) precisely rotate in closed contact. Therefore, from the direction where the first roller (20) and second roller (21) is formed the inlet direction and where the first roller (20) and second roller (21) separate is formed the outlet direction.

The molding groove (30) depressed inwardly along the outer peripheral surface of the first roller (20) and the second roller (21). The edges of dough introduced in the molding groove (30) are cut by friction between the first roller (20) and the second roller (21), thereby producing noodles. The molding groove (30) is formed in a space between the first curved part (31) and a second curved part (32) alternatively arranged in the longitudinal direction of the rotation shafts (10, 11), thereby relieving the problem of wasting the batter from where the molding groove (30) is not formed. This invention can reduce loss of ingredients, increase unit productivity, and reduce processing time for reusing any lost batter, thereby increasing the overall production efficiency.

The molding groove (30) is formed in a space between the first curved part (31) and a second curved part (32) alternatively arranged in the longitudinal direction of the shafts and in varying shapes and depths by the small space part (33) and the large part (34) formed in the first roller, and the first curved part (31) and the second curved part (32) form in the second roller (21).

For this example of use, the molding groove (30) for making round three-dimensional noodles (50) was used, for the molding grooves can come in rectangular, diamond and any other shapes of choice.

Drawing 4 is view of example of use of the three-dimensional noodle cutter.

As illustrated in Drawing 4, the batter entered into the inlet direction between the first and second rollers (20, 21), where the first curved part (31) and the second curved part (32) form in the second roller (21) are arranged to be engaged with each other and rotate, is made into embossed three-dimensional noodles (50) in the molding groove (30), and at the same time, cut by the friction between the first and second rollers (20, 21) and come out in the outlet direction.

Because the current noodle cutters lack the friction between two rollers to cleanly cut the noodles and they end up intertwined with the batter, in this invention, cutting blades (35) are equipped along the edges of the first and second curved parts (31, 32) that are form on the first and second rollers (20, 21), respectively, to enhance cutting performance. It is most important for the first and second rollers (20, 21) to precisely rotate in unison for each cutting blade (35) to interlock.

Drawing 5 is view of example of use of the three-dimensional noodle cutter.

The first and second control saw teeth (40, 41) are attached to both ends of the first and second rollers (20, 21) and precisely control the interlock of the cutting blades (35) on the first and second rollers (20, 21).

To achieve this, the first and second control saw teeth (40, 41) are marked with the first and second contact points (42*a*, 42*b*), so that when the contact points break away from each other over prolonged use, the first and second rollers (20, 21) can be adjusted at the first and second contact points (42*a*, 42*b*), as illustrated in Drawing 5.

Furthermore, because the precise interlocking of the cutting blades (35) can be achieved if the first and second control saw teeth (40, 41) on the first and second rollers (20, 21) are adjusted, an alignment pin (43) fastens the first and second control saw teeth (40, 41), in addition to the fastening component (44), to precisely fasten the positions of the rotation shafts (10, 11) when attached to the first and second rollers (20, 21).

The above description was on the basis of the example provided in the drawings, but this is just an example, and anyone with average knowledge in the technical field shall be able to make desirable modifications or variations. Therefore, the range of technical protection of this invention shall be interpreted by the attached claims, which shall include all technology and ideas within similar ranges.

The invention claimed is:

1. A three-dimensional noodle cutter comprising:
   rotation shafts (10, 11) arranged in parallel with each other and driven by a motor;
   first roller (20) and second roller (21) provided on an outer peripheral surface of the rotation shafts (10, 11) in a form of a cylinder and driven to rotate in close contact with each other; and
   a molding groove (30) depressed inwardly along an outer peripheral surface of the first roller (20) and the second roller (21),
   wherein edges of dough introduced in the molding groove (30) are cut by friction between the first roller (20) and the second roller (21), thereby producing noodles, wherein the molding groove (30) is formed in a space between a first curved part (31) and a second curved part (32) alternatively arranged in a longitudinal direction of the rotation shafts (10, 11), a small space part (33) and a large part (34) formed in the first roller, and the first curved part (31) and the second curved part (32) formed in the second roller (21) are arranged to be engaged with each other and rotate so that the first curved part (31) and the second curved part (32) of the first curved part (31) are aligned with the first curved part (31) and the second curved part (32) of the second curved part (31), respectively, whereby dough introduced in the molding grove (30) is produced into noodles (50) having an embossed three-dimensional shapes, wherein both ends of first and second rollers (20, 21) are attached with the first and second control saw teeth (40, 41), which precisely control a contact of the first and second curved part (31, 32) formed by the first and second rollers (20, 21), and on an inside of each of the first and second control saw teeth (40, 41) is an alignment pin (43) which fastens a coupling of the rollers and saw teeth; outsides of the first and second control saw teeth (40, 41) are marked with first and second contact points (42*a*, 42*b*) to easily identify when the first and second rollers (20, 21) break away from one another and are loosened and make necessary adjustments to the first and second control saw teeth (40, 41).

\* \* \* \* \*